United States Patent
Besier et al.

(10) Patent No.: US 7,322,115 B2
(45) Date of Patent: Jan. 29, 2008

(54) STEERING COLUMN MODULE FOR A MOTOR VEHICLE

(75) Inventors: Holger Besier, Oestrich-Winkel (DE); Gerd Rudolph, Aspisheim (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/509,298

(22) PCT Filed: Feb. 26, 2003

(86) PCT No.: PCT/DE03/00607

§ 371 (c)(1),
(2), (4) Date: May 27, 2005

(87) PCT Pub. No.: WO03/080420

PCT Pub. Date: Oct. 2, 2003

(65) Prior Publication Data

US 2006/0032062 A1 Feb. 16, 2006

(30) Foreign Application Priority Data

Mar. 25, 2002 (DE) .................. 102 13 224

(51) Int. Cl.
*B62D 15/02* (2006.01)

(52) U.S. Cl. ........................................ 33/1 PT

(58) Field of Classification Search ........... 33/1 PT, 33/1 N, 706, 707, 708; 702/145, 151; 324/207.25
See application file for complete search history.

(56) References Cited

U.S. PATENT DOCUMENTS

| | | | | |
|---|---|---|---|---|
| 4,213,089 A * | 7/1980 | Liebermann | ................ | 324/115 |
| 6,737,638 B2 * | 5/2004 | Schmidt et al. | ........ | 250/231.15 |
| 6,848,187 B2 * | 2/2005 | Ito et al. | ..................... | 33/1 PT |
| 6,861,837 B1 * | 3/2005 | Shimizu et al. | ........ | 324/207.25 |
| 6,912,791 B2 * | 7/2005 | Tateishi et al. | ............. | 33/1 PT |
| 6,983,647 B2 * | 1/2006 | Nagaoka et al. | ........... | 73/118.1 |
| 6,987,384 B2 * | 1/2006 | Uehira et al. | .......... | 324/207.25 |
| 2002/0128754 A1 * | 9/2002 | Sakiyama et al. | ............. | 701/1 |
| 2003/0019113 A1 * | 1/2003 | Kofink et al. | ................ | 33/1 PT |
| 2003/0171891 A1 * | 9/2003 | Okumura | .................... | 702/151 |
| 2004/0007067 A1 * | 1/2004 | Meyer et al. | ............. | 73/514.31 |
| 2005/0171727 A1 * | 8/2005 | Sakabe et al. | .............. | 702/151 |
| 2006/0032062 A1 * | 2/2006 | Besier et al. | ................ | 33/1 PT |

FOREIGN PATENT DOCUMENTS

| | | |
|---|---|---|
| DE | 19506938 | 8/1996 |
| EP | 1069025 | 1/2001 |
| JP | 2005257471 A * | 9/2005 |
| WO | 0181119 | 11/2001 |

\* cited by examiner

*Primary Examiner*—R. Alexander Smith
(74) *Attorney, Agent, or Firm*—David P. Wood

(57) ABSTRACT

The invention relates to a steering column module for a motor vehicle, comprising a steering angle sensor (13) that is inserted into a module housing (1,2). The rotor of the steering angle sensor is assigned to a steering column and co-operates with at least one fixed measuring wheel (37), in which angular modifications of the steering column are registered by electronic measuring sensors (22), operating as the stator and connected to the vehicle electric system by means of a central printed circuit board (6). The measuring sensors (22) are fastened to the printed circuit board (6) and the measuring wheel or wheels (37) is/are mounted in a housing (38) that is fixed to the printed circuit board (6).

17 Claims, 2 Drawing Sheets

STEERING COLUMN MODULE FOR A MOTOR VEHICLE

Figure 1:
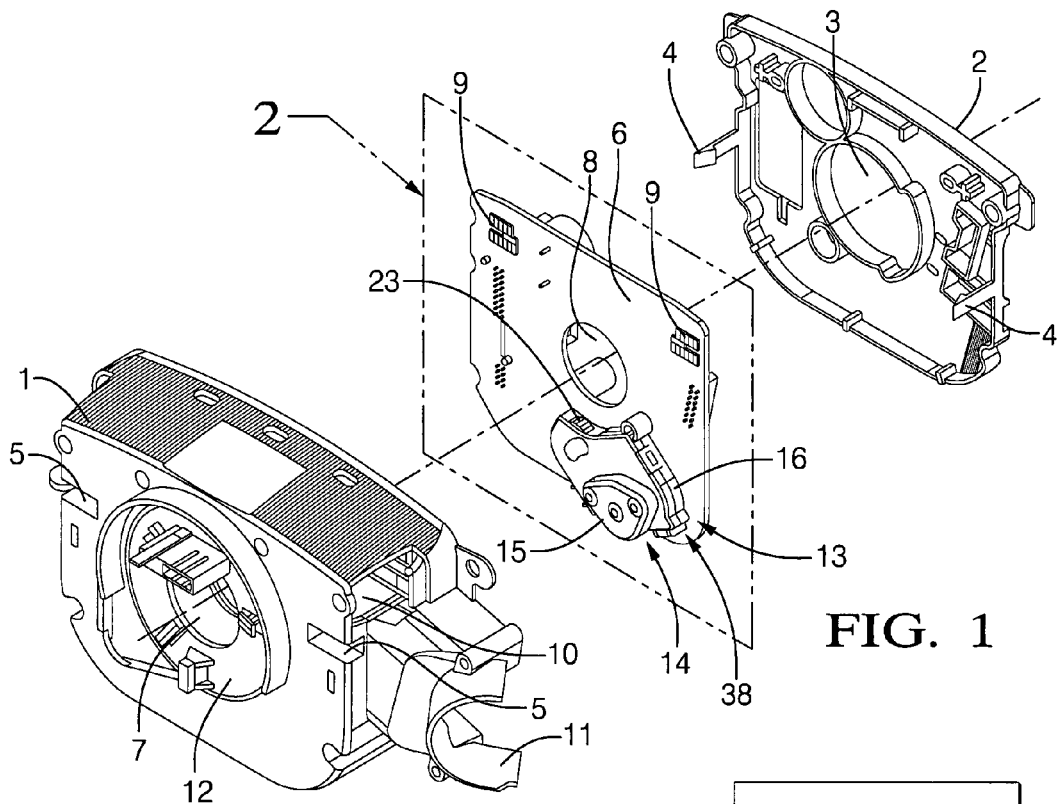

The invention relates to a steering column module for a motor vehicle with a steering angle sensor that is inserted into a module housing. The rotor of the steering angle sensor is assigned to a steering column and interacts with at least one fixed measuring wheel, in which changes in the angle of the steering column are registered by electronic measuring sensors operating as the stator and connected to the on-board vehicle electrical system via a central printed-circuit board.

From DE 44 28 883 C1, an electrical and/or optical device for motor vehicles is known, which is fixed underneath the steering wheel to a stationary holding device arranged on the steering column tube. The holding device is an integral component of a housing belonging to a separate switch. A steering column lining is arranged on the holding device. The holding device carries a connecting device formed as a spiral cable cassette, as well as a steering angle sensor provided with a printed-circuit board. The connecting device is mounted on the side of a housing arrangement of the steering angle sensor assigned to the steering wheel, and the fixed housing part of the connecting device is screwed onto the holding device. The rotatable housing part of the connecting device engages with a region formed as an aperture and operating as a rotor into a circular groove in the housing arrangement of the steering angle sensor.

Furthermore, DE 197 55 094 A1 discloses a steering column module to which is assigned a unit comprising an electrical connecting device and a steering angle sensor. The connecting device is arranged in a housing section, which forms a cover for the stator of the steering angle sensor fixed on a printed-circuit board, wherein the printed-circuit board is formed as a base closing the cover.

The previously explained steering angle sensors each work with an optical detection device, which permits sufficient distance to the rotor. This distance is necessary because the rotor assigned to the steering column has a relatively non-circular movement, which must be compensated together with other installation-specific tolerances.

In addition, from practice, a steering angle sensor is known, which comprises a rotor that is fixed to the steering column and that interacts with a stator. The stator is built as a module and comprises in addition to mechanical components, also a printed-circuit board with measurement electronics and transmission electronics for coupling to the vehicle electrical system, wherein the signals of the measurement electronics are transmitted to a central printed-circuit board of the steering column module and from there to the vehicle electrical system. Thus, both the printed-circuit board of the stator and also the printed-circuit board of the steering column module is twice equipped with partially identically components. Finally, two printed-circuit boards necessary for the signal transmission are to be fabricated and assembled.

The problem of the invention is to design a steering column module of the type mentioned in the introduction, which is manufactured economically with a reliable function.

According to the invention, the problem is solved in that the measuring sensors are mounted on the printed-circuit board and the one or more measuring wheels are mounted in a housing fixed to the printed-circuit board.

Due to this measure, the mechanical and the electronic components of the steering angle sensor are separated. The mechanical components of the steering angle sensor, namely the one or more measuring wheels and the rotor, are assigned to the housing or the steering column and the electronic components, namely the measuring sensors and optional evaluation electronics, are arranged on the central printed-circuit board, wherein the printed-circuit board is connected to other components, for example, a flat spiral spring and steering column switches. An additional printed-circuit board for the steering angle sensor is eliminated; therefore, a relatively economical manufacturing of the steering column module is guaranteed. Because the central printed-circuit board has all of the components for signal transmission to the vehicle electrical system, a reliable function of the steering column module is also guaranteed without extra interfaces.

It is useful if the rotor and the measuring wheel are formed as gears. Thus, engagement of the rotor on the measuring wheel with low friction and a transfer of the changes in the rotational angle of the steering column with relatively low play are guaranteed.

Preferably, a first measuring gear drives a second measuring gear with an intermediate wheel between, wherein measuring sensors are assigned to both measuring gears. Through this gearing, a certain ratio is realized within the steering angle sensor, by means of which even very small changes in the rotational angle of the steering column can be detected with a relatively high accuracy.

Preferably, each of the first measuring gear and the second measuring gear has a measuring magnetic ring inserted on the end and interacting with the measuring sensors formed as stray field sensors. It is useful if each of the measuring gears comprises a shielding sheet for the measuring magnetic ring. Thus, the steering angle sensor works according to the so-called Stegmann system, in which one magnet is assigned to every two stray field sensors, Hall sensors. Advantageously, the measuring sensors extend into the housing in a position directed towards the measuring wheels.

In order to not transfer the non-circular movement of the steering column to the measuring wheels, according to an advantageous configuration of the invention, there is a tolerance compensation device arranged in the housing between the rotor and the first measuring gear driven by the rotor.

Preferably, the tolerance compensation device comprises a compensation gear, which engages both the rotor and also the first measuring gear in a spring-loaded way. Because the distance between the steering column and the tolerance compensation device fluctuates and nevertheless a noise-free interaction between the rotor and the measuring gear must be guaranteed, the spring-loaded compensation gear is provided, which is mounted flexibly and assumes a position corresponding to the appropriate distance between the steering column and the tolerance compensation device, wherein the rotor formed as a gear provides for a nearly direct drive of the compensation gear.

In order to be able to change the position of the compensation gear within certain limits, advantageously the compensation gear is mounted with teeth exposed in regions in a cage, which is engaged at one end by a tension spring, whose other end is fixed to the housing. The tension spring realizes the positioning of the compensation gear both on the rotor and also on the measuring gear.

For guaranteeing a compact structure, it is useful if the housing assembled from a cover and also a base supports the cage of the compensation gear, the two measuring gears, as well as the intermediate wheel.

Preferably, the cover has a support bolt for the intermediate wheel, whose free end engages in a corresponding bore hole of the base. For achieving a relatively low assembly expense, the support bolt is injection molded on the cover and thus manufactured together with this piece in one manufacturing process.

Furthermore, it is necessary to provide supports for the measuring gears. For this purpose, guide holes spaced apart from each other for receiving support axles for the two measuring gears are preferably formed in the cover and engage in corresponding openings of the base.

To achieve a relatively simple and secure fixing of the housing, preferably the cover has clip arms for fixing the housing on the printed-circuit board.

So that the measuring sensors arranged on the central printed-circuit board are led into the region of the measuring gears, advantageously the base is provided in the region of the measuring magnet rings of the measuring gears with two recesses that are offset relative to each other and that project through the measuring sensors. Preferably, the measuring sensors are coupled for signal evaluation via the printed-circuit board with an on-board vehicle computer. Preferably, the printed-circuit board comprises a bus interface for connecting to the on-board vehicle computer.

Preferably, the rotor is assigned to a cover covering a flat spiral spring in a module housing top part. As a rotatable component spanning the flat spiral spring, the cover completes the performed changes in rotational angle synchronously with the steering wheel and thus with the steering column. Thus, the rotor changes its position to the same extent as the steering column, which is why exact measurement values are detected in terms of the change in rotational angle.

It is understood that the previously mentioned and subsequent features still to be explained can be used not only in the indicated combination, but also in other combinations. The scope of the present invention is defined only by the claims.

Figure 2:
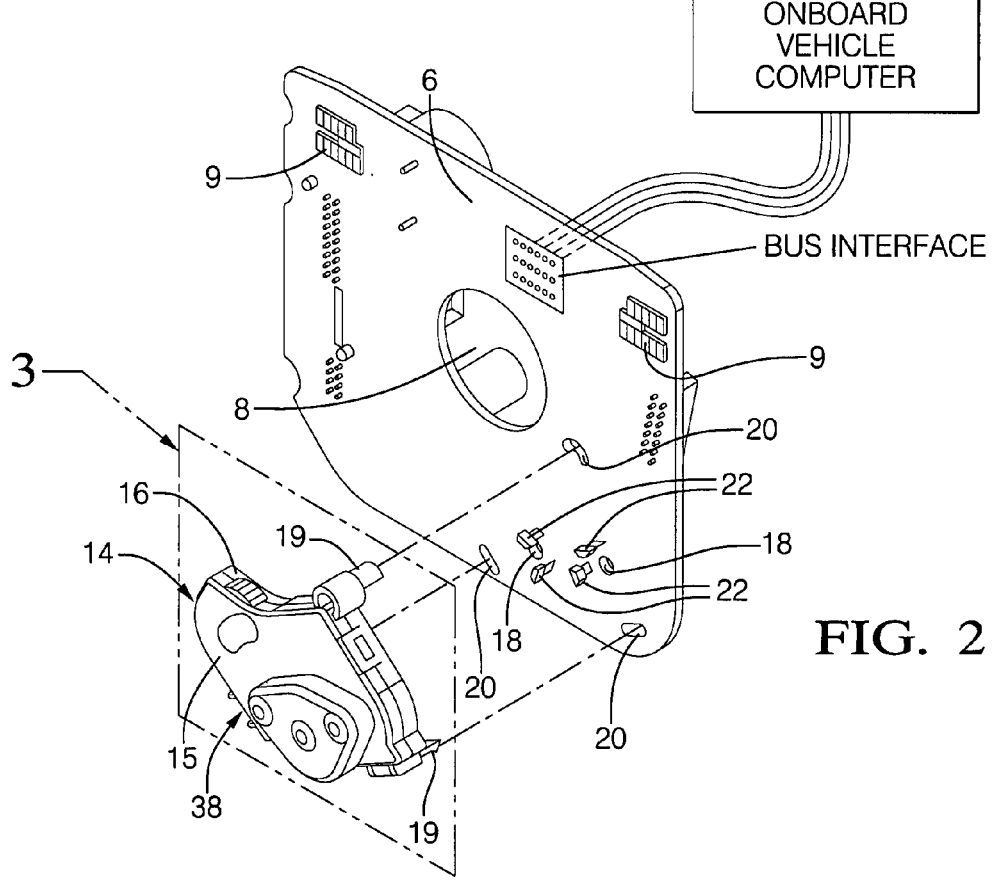
Figure 3:
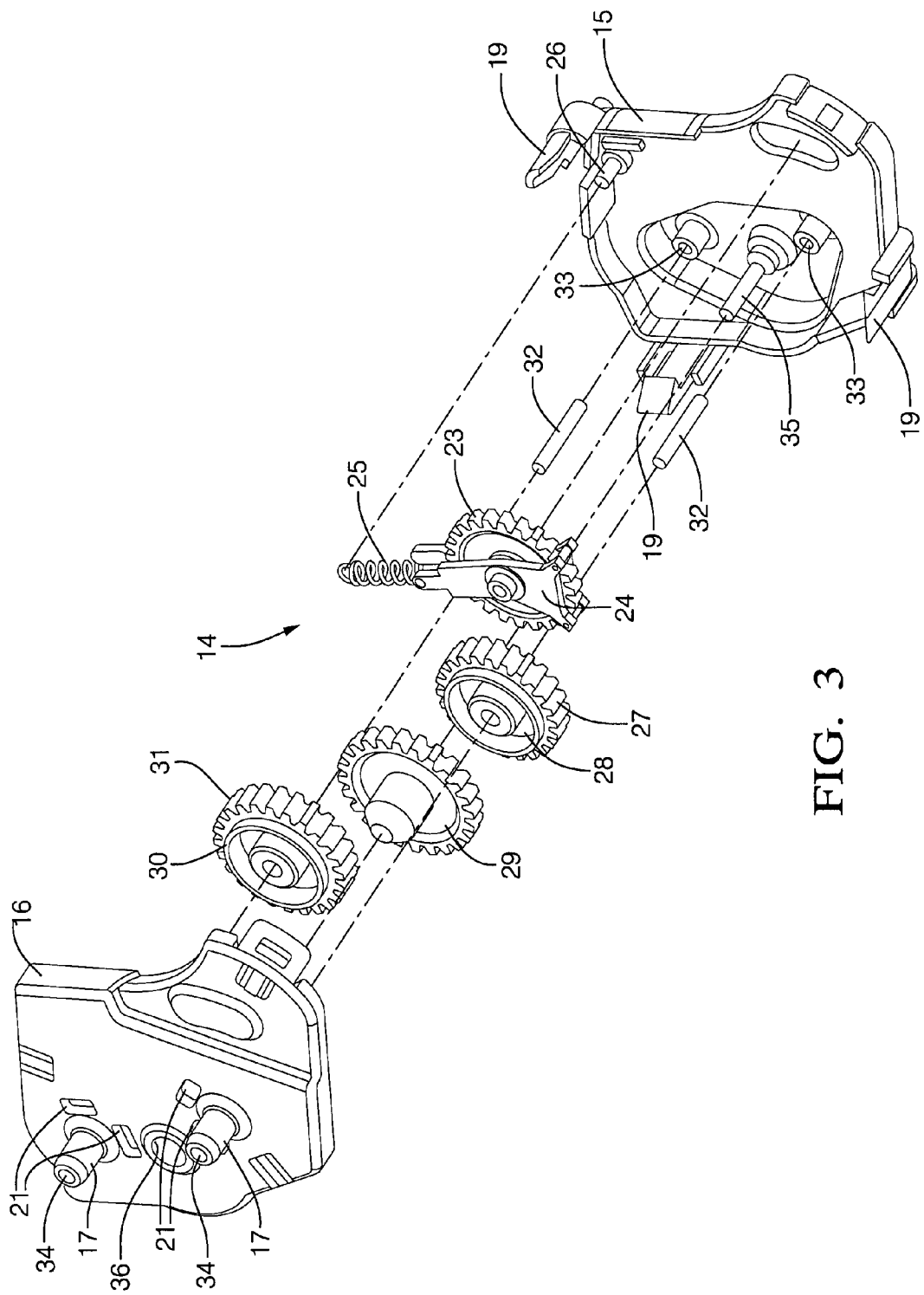

The invention is explained in more detail in the following using an embodiment with reference to the associated drawings. Shown are:

FIG. 1, an exploded view of a steering column module according to the invention, FIG. 2, an enlarged exploded view of the detail II from FIG. 1, and FIG. 3, an enlarged exploded view of the detail III from FIG. 2.

A steering column module comprises a module housing assembled from a module housing top part 1 and a module housing bottom part 2, wherein a cylindrical recess 3 for fixing the steering column module to a (not-shown) steering column tube of a motor vehicle is formed on the module housing bottom part 2. Furthermore, the module housing bottom part 2 has clip arms 4, which are on the edges and which engage in corresponding clip openings 5 of the module housing top part 1 for assembling the module housing bottom part 2 and the module housing top part 1. The module housing bottom part 2 receives a central printed-circuit board 6, which is coupled to an on-board vehicle electrical system, as well as an on-board vehicle computer of the motor vehicle. The module housing top part 1 gripping over the module housing bottom part 2 at the edges is provided with a recess 12 for receiving a flat spiral spring, which couples electrical components assigned to the steering wheel with the on-board vehicle electrical system via the printed-circuit board 6.

The printed-circuit board 6 has a cylindrical opening 8 aligned with the recess 3 of the module housing bottom part 2, as well as with a hole 7 of the module housing top part 1 for passing through a (not-shown) steering column, whose free end is connected to a steering wheel above the module housing top part 1. Furthermore, the printed-circuit board 6 is provided with connections 9 for (not-shown) steering column switches, whose operating elements project through holes 10 of the module housing top part 1. Furthermore, the printed-circuit board 6 is connected to an ignition lock, which is inserted into an opening 11 formed in the module housing top part 1.

In order to determine a relative change in the rotational angle of the steering wheel relative to the steering column module, between the connecting device and the module housing top part 1 of the steering column module there is a steering angle sensor 13, which essentially comprises a (not-shown) rotor formed as a gear and a measuring wheel 37 formed as a first measuring gear 27, wherein measuring sensors 22 are assigned to the first measuring gear 27. The rotor connects to the steering column.

The measuring wheel 37 assigned to the rotor is mounted in a housing 38, which is assembled from a cover 15 and a base 16 clipped to the cover. Centering pins 17, which are spaced relative to each other and which engage in corresponding centering holes 18 of the printed-circuit board 6, are formed on the base 16. For fixing the housing 38, the cover 15 is provided with clip arms 19 to be inserted into clip recesses 20 of the printed-circuit board 6. Furthermore, the base 16 has recesses 21, in which measuring sensors 22, which are fixed to the printed-circuit board 6 and which are formed as stray field sensors, so-called Hall sensors, extend into the housing 38. Due to the assignment of the measuring sensors 22 to the printed-circuit board 6, the electrical/electronic components and the mechanical components of the steering angle sensor 13 are separated.

For detecting a change in the rotational angle of the steering column, the rotor drives a compensation gear 23, which is assigned to a tolerance compensation device 14 and which is mounted floating in the housing 38 via a cage 24. One end of a tension spring 25, whose other end is fixed to a retaining pin 26 formed on the cover 15, is fixed on the cage 24. Through the floating, spring-loaded arrangement of the compensation gear 23, a tolerance compensation between the rotor, which exhibits a non-circular movement due to the manufacturing and support of the steering column, and the housing 38 is guaranteed. The compensation gear 23 engages the first measuring gear 27, which carries a measuring magnet ring 28 on the end. An intermediate wheel 29 is set in rotation via the first measuring gear 27, which in turn drives a second measuring gear 31 likewise provided with an end measuring magnet ring 30.

The first measuring gear 27 and the second measuring gear 31 are arranged on support axles 32, which are inserted with one end into guide holes 33 of the cover 15. With the other end, the support axles 32 project into corresponding openings 34 of the base 16. These openings are formed in the centering pins 17. The intermediate wheel 29 is held on a support bolt 35, which is assigned to the cover 15 and whose free end engages in a corresponding hole 36 of the base 16.

The measuring sensors 22, of which two are assigned to each of the measuring magnet rings 28, 30, detect the rotation of the measuring magnet rings 28, 30 due to a change in the rotational angle of the steering column according to the so-called Stegmann system. The signals of the measuring sensors 22 assigned to the printed-circuit board 6 are transmitted directly to the on-board vehicle electrical system or the on-board vehicle computer without the intermediate connection of other electronic components.

LIST OF REFERENCE SYMBOLS

1 Module housing top part
2 Module housing bottom part
3 Recess
4 Clip arm
5 Clip opening
6 Printed-circuit board
7 Hole
8 Opening
9 Connection
10 Through-hole
11 Opening
12 Recess
13 Steering angle sensor
14 Tolerance compensation device
15 Cover
16 Base
17 Centering pin
18 Centering hole
19 Clip arm
20 Clip recess
21 Recess of 16
22 Measuring sensor
23 Compensation gear
24 Cage
25 Tension spring
26 Retaining pin
27 First measuring gear
28 Measuring magnet ring
29 Intermediate wheel
30 Measuring magnet ring
31 Second measuring gear
32 Support axle
33 Guide hole of 15
34 Opening of 16
35 Support bolt
36 Hole
37 Measuring wheel
38 Housing

The invention claimed is:

1. A steering column module for a motor vehicle, the vehicle having an on-board vehicle electrical system and a steering column relative to which a steering wheel may rotate so as to exhibit a rotational angle, the steering column module comprising:
a steering angle sensor contained within a module housing, said module housing configured to be mounted on, and fixed with respect to, said steering column, said steering angle sensor comprising a printed circuit board fixed within said module housing and at least one measuring wheel mounted in a wheel housing fixed on the circuit board, said measuring wheel positioned and configured to rotate in response to a change in the rotational angle of said steering wheel said circuit board comprising a plurality of electronic measuring sensors that are connected to the on-board vehicle electrical system via the central printed-circuit board and that are configured to detect changes in the angle of said measuring wheel.

2. A steering column module according to claim 1, wherein the said at least one measuring wheel is formed as a gear.

3. A steering column module according to claim 2, wherein a first measuring wheel drives a second measuring wheel with the intermediate connection of an intermediate wheel, wherein said measuring sensors are assigned to both measuring wheels.

4. A steering column module according to claim 3, wherein the first measuring wheel and the second measuring wheel each have a measuring magnet ring, which is inserted at the ends and which interacts with the measuring sensors formed as stray field sensors.

5. A steering column module according to claim 4, wherein each of the measuring wheels comprises a shielding plate for the measuring magnet ring.

6. Steering column module according to claim 4, wherein the base is provided in the region of the measuring magnet rings of the measuring wheels with two recesses, which are offset relative to each other and which project through the measuring sensors.

7. A steering column module according to claim 1, wherein the measuring sensors extend into the wheel housing in a position aligned with the at least one measuring wheel.

8. A steering column module according to claim 1, wherein a tolerance compensation device arranged in the housing is provided so as to cause said at least one measuring wheel to rotate in response to a change in the rotational angle of said steering wheel.

9. A steering column module according to claim 8, wherein the tolerance compensation device comprises a compensation gear, which connects in a spring-loaded way so as to provide a mechanical coupling between said steering wheel and said assigned first measuring wheel.

10. A steering column module according to claim 9, wherein the compensation gear is mounted in a cage exposing its gearing in some regions and one end of this cage engages a tension spring, whose other end is fixed to the housing.

11. A steering column module according to claim 9, wherein the housing is assembled from a cover and wherein a base supports the cage of the compensation gear and said at least one measuring wheel.

12. A steering column module according to claim 11, wherein the cover has a support bolt for the at least one measuring wheel, whose free end engages in a corresponding hole of the base.

13. A steering column module according to claim 11, wherein said at least one measuring wheel comprises at least two measuring wheels, and wherein guide holes, which are spaced apart from each other for receiving support axles for the two measuring wheels and which engage in corresponding openings of the base, are formed in the cover.

14. A steering column module according to claim 1, wherein the wheel housing has clip arms for attaching the wheel housing to the printed-circuit board.

15. Steering column module according to claim 1, wherein the measuring sensors are coupled with the on-board vehicle computer via the printed-circuit board.

16. Steering column module according to claim 15, wherein the printed-circuit board comprises a bus interface for connecting to the on-board vehicle computer.

17. Steering column module according to claim 1, further comprising a cover spanning a flat spiral spring in a module housing top part.

* * * * *